United States Patent [19]
Breitschwerdt et al.

[11] 3,719,135
[45] March 6, 1973

[54] INSTALLATION FOR CONTROLLING THE TEMPERATURE OF VEHICLE INTERIOR SPACES

[75] Inventors: Werner Breitschwerdt, Stuttgart-Botnang; Gunter Gmeiner, Sindelfingen; Albert Stolz, Singelfingen, all of Germany

[73] Assignee: Daimler-Benz Aktiengesellschaft, Stuttgart-Unterturkheim, Germany

[22] Filed: July 31, 1970

[21] Appl. No.: 60,000

[30] Foreign Application Priority Data

Aug. 2, 1969 Germany............P 19 39 434.4

[52] U.S. Cl....................................98/2.07, 98/2.08
[51] Int. Cl. .............................................B60h 1/24
[58] Field of Search............98/2.04, 2.06, 2.07, 2.08, 98/2.11, 2.19, 4

[56] References Cited

UNITED STATES PATENTS

| | | | |
|---|---|---|---|
| 3,208,368 | 9/1965 | Perzs | 98/2.07 |
| 2,150,110 | 3/1939 | Strauss | 98/2.04 |
| 2,523,923 | 9/1950 | Rodert | 98/2.04 |
| 2,796,820 | 6/1957 | Moore | 98/2.11 |
| 3,078,779 | 2/1963 | Wilfert | 98/2.07 |
| 3,301,484 | 1/1967 | De Castelet | 98/2.06 |

*Primary Examiner*—Meyer Perlin
*Attorney*—Craig & Antonelli

[57] ABSTRACT

An installation for controlling the temperature of vehicle interior spaces, particularly of passenger motor vehicles which include an air conduction channel system adapted to be connected with the vehicle heating system and located within the area below the windshield, and a terminal wall arranged in front of the vehicle passengers approximately between the lower edge of the windshield and the upper boundary of the foot space; at least a part of the air guide channel system is constructed as a cross channel located directly behind the terminal wall which is in communication with an air guide channel and preferably extends over the entire width and height of the terminal wall; the terminal wall itself may be constructed of deformable material and may be adapted to be pivoted down along the lower edge thereof.

27 Claims, 2 Drawing Figures

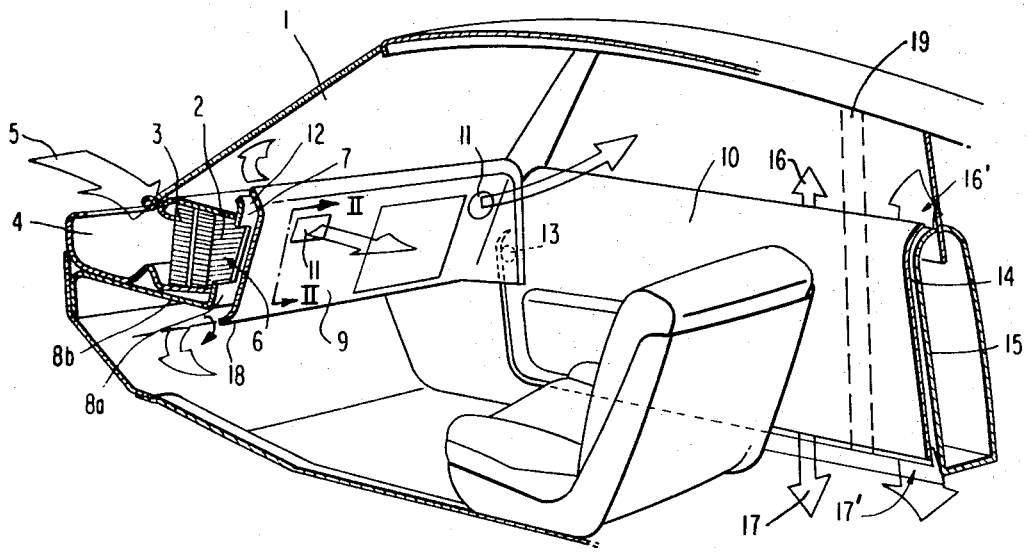
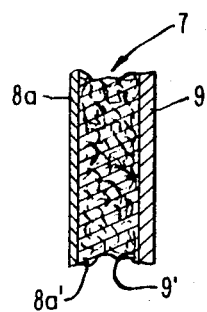

INSTALLATION FOR CONTROLLING THE TEMPERATURE OF VEHICLE INTERIOR SPACES

The present invention relates to an installation for controlling the temperature, i.e., for heating and/or air-conditioning vehicle interior spaces, especially of passenger motor vehicles with air conduction channels adapted to be connected with the vehicle heating system and located within the area below the windshield and with a preferably padded terminal wall arranged in front of the vehicle passengers approximately between the windshield bottom edge and the upper boundary of the foot space.

It is known in the prior art for the protection of the vehicle passengers to pad or so construct the forward closure walls of the interior spaces of passenger motor vehicles that in case of an impact of vehicle passengers as a result of an accident, they deform permanently and are thereby able to absorb the impact energy. Such types of closure or terminal walls, in order to be effective, have to require a relatively large structural space in order that the deformation path necessary for absorbing the impact energy is available.

It is also known in connection with vehicles with such terminal walls constructed as an impact protection, to arrange for the purpose of ventilation and/or heating of the vehicle passenger space, air conduction channels within the area below the windshield and to conduct from there the air both toward the windshield as also by way of corresponding apertures in the terminal wall into the passenger space of the vehicle. It has now been discovered that heating installations of this type, notwithstanding the relatively high temperatures of the air blown into the passenger space of the vehicle, cannot cause a comfort in the passenger space, for example, during the winter, because with the customary heating installations, the walls delimiting the vehicle passenger space, i.e., the terminal wall and essentially the inner walls of the front doors remain themselves cold. Since these surfaces and in particular the forward terminal wall are disposed relatively close to the vehicle passengers, these cold surfaces become noticeable in a very disagreeable and unpleasant manner.

The present invention is concerned with the task to avoid these disadvantages and to provide a simple heating and air-conditioning installation which also satisfies the requirement as regards the internal safety of the vehicle passengers by the arrangement of energy-absorbing impact surfaces. Starting with the recognition that the structural space for the deformation path, made available in the types of constructions known heretofore, remains essentially non-utilized, the present invention essentially resides in that at least a part of the air conduction channels is constructed as a transverse channel or duct, arranged directly behind the terminal wall, which is in communication with the air conduction or air guide means. As a result of this construction, the forward terminal wall is heated during the heating and creates a comfortable interior temperature in the vehicle. Simultaneously therewith, the necessary deformation path for the absorption of impact energy is made available.

In an advantageous type of construction of the present invention, the cross channel may extend over the entire width and height of the terminal wall and may be composed appropriately of two shell-shaped parts, of which the part facing the vehicle passenger space is constructed as terminal wall with inserted instruments and the like. This embodiment enables a relatively inexpensive construction since it is possible to preassemble the terminal wall as a complete structural unit and to install the same only thereafter into the vehicle.

A particularly advantageous type of construction of the present invention results if the part of the wall of the cross channel facing the engine is constructed as sound-insulation or sound-absorbing wall with a wall portion extending forwardly up to the dashboard of firewall. As a result of this type of construction, the known insulation of the vehicle passenger space against the noise of forwardly disposed engines, is attained in a very simple manner whereby simultaneously also the construction of the cross channel of the present invention is simplified.

The inner sides of the shell-like parts of the walls of the cross channel may be so lined with a filter material that the cross channel or cross duct is effective as labyrinth filter. It becomes possible thereby to conduct air, filtered in an excellent manner, into the vehicle interior. In order to make accessible the filter as well as also the back side of the instruments and the like arranged at the terminal wall, it has proved particularly simple and appropriate if the terminal wall is adapted to be pivoted down about an axis formed by hinges or the like provided at its lower edge. The problems of the assembly of the instruments, especially in case of possible later necessary repairs can be solved in this manner simply and efficiently. In order to attain a good passenger protection in case of accidents, provision may be made that at least the closure wall consists of a material deformable in case of impact. Of course, also the inner wall of the cross channel facing the engine may consist of deformable material so that together with the filter material and the cross channel a nearly ideal deformation assembly is available for the protection of the passengers.

It is particularly advantageous if the cross channel extends to and is delimited laterally at the two inner door coverings and is in communication by way of flow apertures with an air conduction space disposed between the door cover and the door housing. As a result thereof, also the sides of the doors facing the passengers can be heated so that the comfort in the vehicle is considerably increased. The air conduction space may be provided with this type of construction over the entire inner door surface and may be open in a slot-like manner exclusively in the direction toward the side window panes. A simple defrosting possibility and a possibility for drying side windows covered with moisture results therefrom which could not have been attained at all heretofore or only in a very complicated manner. Also the inner door cover may be constructed deformable in a conventional manner. Finally, a connecting aperture may be provided leading to a similar air conduction space in the rear door or in the body part adjoining rearwardly the front door so that all walls possibly coming in contact with the vehicle passengers may be heated.

Accordingly, it is an object of the present invention to provide a heating installation for vehicle passenger spaces which avoid by simple means the aforementioned shortcomings and drawbacks encountered in the prior art.

Another object of the present invention resides in an installation for heating and/or air-conditioning vehicle interior spaces which assures greatly improved comfort to the vehicle passengers as well as greater safety to the passengers in case of impact accidents.

A further object of the present invention resides in a temperature control installation utilizing an air guiding duct that constitutes simultaneously a large impact surface in front of the passengers, contributing greatly to the improved safety of the passengers.

Still another object of the present invention resides in a heating and/or air-conditioning installation for vehicles of the type described above which achieves the aforementioned aims and objects by extremely simple and relatively inexpensive means, permitting simple assembly as well as simple preassembly of certain parts.

A further object of the present invention resides in a heating and ventilation system for passenger motor vehicles which only permits a simple defrosting and/or ventilation of the windshield and side windows of the doors but which also provides easy access to all the parts mounted in the terminal wall disposed in front of the passengers.

These and other objects, features and advantages of the present invention will become more obvious from the following description when taken in connection with the accompany drawing which shows, for purposes of illustration only, one embodiment in accordance with the present invention, and wherein:

FIG. 1 is a partial perspective view of a passenger motor vehicle, cut in the longitudinal direction approximately through the center of the forward part of a passenger space of a passenger motor vehicle in accordance with the present invention.

FIG. 2 is a partial cross-sectional schematic view taken in the direction II—II, of FIG. 1.

Referring now to the drawing, a forwardly disposed body structure projecting into the interior of the vehicle passenger space is arranged below the windshield 1 of the body provided thereat, in which, in addition to a number of auxiliary aggregates (not illustrated) is located also the heat-exchanger 2 and possibly also an evaporator 3 for the air-conditioning installation of the vehicle. The air guide channel or duct 4 which leads to the heat-exchanger 2 is in communication by way of an aperture with the free space (atmosphere) in front of the windshield 1 and is thus supplied during the drive with fresh air in the direction of arrow 5 as a result of the occurring dynamic pressure. However, the air may also be sucked into the vehicle interior with the aid of a fan or blower (not shown) when the vehicle stands still.

The space, in which is arranged the heat-exchanger 2, is in communication by way of at least one aperture generally designated by reference numeral 6 with the cross channel 7; the cross channel 7 is delimited in the direction toward the engine by the wall 8a and in the direction toward the vehicle passenger space by the terminal wall 9. The wall 8a is constructed simultaneously as sound-absorbing wall with a wall portion 8b extending up to the firewall so that the noises of the engine are kept away from the passenger interior space. The aperture 6 is provided in the wall 8a. The terminal wall 9 extends over the entire vehicle width, from the right door cover 10 to the left door cover (not shown). The terminal wall 9 is provided with the conventional air supply apertures leading into the passenger space. Additionally, apertures for the instruments of the vehicle and apertures for the glove compartment are provided in the terminal wall 9 in a conventional manner. The terminal wall 9 consists of a material plastically deformable in case of an impact of passengers due to an accident, which is able to absorb the impact energy by deformation work. For this purpose, the cross channel 7 makes available a portion of the necessary deformation space. Also the walls 8a and 8b may be made from plastically deformable material so that a still larger deformation path is available which also permits the absorption of larger impact energies.

The cross channel 7 is closed off at the top and at the bottom and is provided with apertures 12 adapted to be closed leading only to the windshield and downwardly into the foot space, which permit the supply of heated air, possibly also of fresh or cooled air, into the vehicle passenger space. For the purpose of better accessibility of the cross channel 7, the terminal wall 9 is adapted to be pivoted downwardly about an axis 18, formed, for example, by a shaft or the like, provided at the lower edge of the terminal wall 9.

At the right side thereof, the cross channel 7 is in communication by way of the aperture 13 with a space 14 between the inner door cover 10 and the inner door housing 15. For this purpose, the inner door cover 10 is arranged at a certain distance from the door inner wall 15. Also the space 14 is closed on all sides thereof and is provided with discharge apertures 16 and 16' leading only to the side windows which may serve for the ventilation of the two lateral window panes. However, provision may also be made that further apertures 17 and 17' are provided at the lower rearward end of the door, through which the heated air may enter, for example, into an analogous space provided in the rear door (schematically shown to the rear of door post 19) between the inner door cover and the inner door housing thereof. It becomes possible by this type of construction to heat or to cool in case of turned-on air condition installation, all the walls arranged in proximity to the vehicle passengers and to increase thereby the comfort on the inside of the vehicle.

Additionally, the protection of the passengers in case of an impact is considerably increased since also the inner door cover 10 may consist of a correspondingly deformable, possibly also padded material. Also, the terminal wall 9 may, of course, be additionally padded in the direction toward the interior space.

Furthermore, provision may also be made that the inner walls of the cross channel 7, i.e., the inwardly facing side of the terminal wall 9 and of the wall 8a are lined with a filter material which may be arranged, for example, in the form of ribs or also continuously. FIG. 2 shows this filter material, 8a' and 9', in schematic form. In this manner, the cross channel 7 acts as a labyrinth filter so that the air entering into the vehicle passenger space can be purified in an excellent manner. Simultaneously therewith, however, additional cushioning and deformation material is produced thereby which, together with the available deformation path, helps to reduce the danger of injuries to the vehicle passengers.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for controlling the temperature of vehicle interior spaces, especially of passenger motor vehicles having a windshield adjacent the forward end of its passenger space, comprising: air guide channel means for conducting air from a vehicle temperature changing system to the vehicle interior spaces, and a terminal wall means arranged immediately adjacent the vehicle passenger space between a lower edge of the windshield and the upper boundary of a passenger foot space, said air guide channel means including a first channel means communicating directly with the vehicle air temperature changing system and a second cross channel means communicating directly with said first channel means, said second cross channel means being arranged directly adjacent the side of the terminal wall means facing away from the vehicle passenger space for changing the temperature of the terminal wall means, and terminal wall means being heat conductive through its thickness whereby the temperature of the side of the terminal wall means facing the passenger space is readily changed by the air passing through the second cross channel means.

2. An installation according to claim 1, characterized in that the terminal wall means is padded on its surface facing the passenger space for cushioning collision forces between the passengers and the terminal wall means.

3. An installation according to claim 1, characterized in that the second cross channel means extends substantially over the entire width and height of the terminal wall means.

4. An installation according to claim 3, characterized in that the cross channel means is formed of two shell-like parts, of which the part facing the vehicle interior space is constructed as the terminal wall means.

5. An installation according to claim 4, characterized in that the part of the cross channel means facing the engine is constructed as a sound-absorbing wall with a wall section extending forwardly up to a firewall.

6. An installation according to claim 4, characterized in that the inner side of the shell-like parts are so lined with filter material that the cross channel means is effective as a labyrinth filter for filtering and cleaning the air supplied to the vehicle interior spaces.

7. An installation according to claim 1, characterized in that the second cross channel means laterally adjoins two inner door cover means disposed respectively on passenger doors arranged at opposite sides of the vehicle, said second cross channel means having laterally open end sections arranged rearwardly of the most forward extent of the inner door cover means for communicating with aperture means provided in said inner door cover means when the respective door is closed, said inner door cover means defining one side of an air conduction space arranged in the respective doors.

8. An installation according to claim 7, characterized in that the laterally open end sections of the second cross channel means have cross-sectional sizes substantially larger than the aperture means in said inner door cover means.

9. An installation according to claim 7, characterized in that the air conduction space is provided over the entire inner door surface and is opened in a slot-like manner only in the direction toward the respective side window.

10. An installation according to claim 9, characterized in that additionally a connecting aperture is provided leading to a similar further air conduction space.

11. An installation according to claim 10, characterized in that the further air conduction space is located in the rear door.

12. An installation according to claim 10, characterized in that the further air conduction space is provided in the rearwardly adjoining body part.

13. An installation according to claim 10, characterized in that the inner door cover means is constructed of plastically deformable material for absorbing collision forces between the passengers and the inner door cover means.

14. An installation according to claim 7, characterized in that additionally a connecting aperture is provided leading to a similar further air conduction space.

15. An installation according to claim 14, characterized in that the further air conduction space is located in the rear door.

16. An installation according to claim 14, characterized in that the further air conduction space is provided in the rearwardly adjoining body part.

17. An installation according to claim 7, characterized in that the inner door cover means is constructed of plastically deformable material for absorbing collision forces between the passengers and the inner door cover means.

18. An installation according to claim 1, characterized in that the cross channel means is formed of two shell-like parts, of which the part facing the vehicle interior space is constructed as the terminal wall means.

19. An installation according to claim 18, characterized in that the part of the cross channel means facing the engine is constructed as a sound-absorbing wall with a wall section extending forwardly up to a firewall.

20. An installation according to claim 18, characterized in that the inner side of the shell-like parts are so lined with filter material that the cross channel means is effective as a labyrinth filter for filtering and cleaning the air supplied to the vehicle interior spaces.

21. An installation according to claim 1, characterized in that pivot means are provided for pivoting the terminal wall means about an axis extending substantially along the lower edge thereof.

22. An installation according to claim 1, characterized in that the terminal wall means consists of a material plastically deformable for absorbing collision forces between the passengers and the terminal wall means during an impact.

23. An installation according to claim 1, characterized in that said air temperature changing system is an air conditioner.

24. An installation according to claim 1, characterized in that said air temperature changing system is a heater.

25. An installation for controlling the temperature of vehicle interior spaces, especially of passenger motor vehicles having a windshield, comprising: air guide channel means for conducting heated air from a vehicle heating system to the vehicle interior spaces, and a terminal wall means arranged immediately adjacent a vehicle passenger space between a lower edge of the windshield and the upper boundary of a passenger foot space, said terminal wall means including means for inserting instruments and the like, said air guide channel means including a first channel means communicating directly with the vehicle heating system and a second cross channel means communicating directly with said first channel means, said second cross channel means being arranged directly behind and extending substantially over the entire width and height of the terminal wall means, said second cross channel means being formed of two shell-like parts, one of said shell-like parts being the terminal wall means, the inner sides of the shell-like parts being lined with filter material so that the second cross channel means effectively forms a labyrinth filter, characterized in that the terminal wall means is adapted to be pivoted about an axis extending substantially along the lower edge thereof.

26. An installation according to claim 25, characterized in that the terminal wall means consists of a material deformable during an impact.

27. An installation according to claim 26, characterized in that the part of the wall of the cross channel means facing the engine is constructed as sound-absorbing wall with a wall section extending forwardly up to a firewall.

* * * * *